United States Patent
Combs et al.

(10) Patent No.: US 6,468,622 B1
(45) Date of Patent: *Oct. 22, 2002

(54) TRACK CONTROL MAT AND METHOD OF MAKING THE SAME

(75) Inventors: John S. Combs, LaGrange, GA (US); Michael McHargue, Lanett, AL (US)

(73) Assignee: Kleen-Tex Industries Inc., La Grange, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/732,322
(22) PCT Filed: Apr. 29, 1994
(86) PCT No.: PCT/US94/04687
§ 371 (c)(1),
(2), (4) Date: May 6, 1997
(87) PCT Pub. No.: WO95/30040
PCT Pub. Date: Nov. 9, 1995

(51) Int. Cl.[7] .......................... A47L 23/22; B32B 33/00; D05C 17/02; D05C 15/04
(52) U.S. Cl. .............................. 428/92; 428/95; 428/97; 156/72; 15/215; 15/217
(58) Field of Search .............................. 428/92, 95, 97; 15/215, 217, 216; 156/72

(56) References Cited

U.S. PATENT DOCUMENTS

| | | |
|---|---|---|
| 3,011,243 A | 12/1961 | Herrnstadt |
| 3,940,522 A | 2/1976 | Wessells |
| 3,982,977 A | 9/1976 | Gordon |
| 4,045,605 A | 8/1977 | Breens et al. |
| 4,430,851 A | 2/1984 | Sundet |
| 4,454,196 A | 6/1984 | Iohara et al. |
| 4,466,331 A | 8/1984 | Matheson |
| 4,619,108 A | 10/1986 | Hotta |
| 4,711,191 A | 12/1987 | Schwartz |
| 4,808,459 A | 2/1989 | Smith et al. |
| 4,820,566 A | 4/1989 | Heine et al. |
| 4,902,465 A | * 2/1990 | Kerr et al. .................. 264/257 |
| 5,055,333 A | 10/1991 | Heine et al. |
| 5,209,974 A | 5/1993 | Martin et al. |
| 5,284,009 A | 2/1994 | Tung et al. |
| 5,305,565 A | * 4/1994 | Nagahama et al. ............ 52/177 |
| 5,887,416 A | * 3/1999 | Shimono et al. ............... 428/88 |
| 5,987,867 A | * 11/1999 | Lang et al. .................... 57/236 |

FOREIGN PATENT DOCUMENTS

| | | | |
|---|---|---|---|
| EP | 0 430 916 A2 | 5/1991 | |
| FR | 2 645 004 | 3/1989 | |
| JP | 63-92769 | 4/1988 | |
| WO | WO 9635836 A1 | * 11/1996 | ........... D05C/17/02 |

OTHER PUBLICATIONS

Patent Abstracts of Japan; vol. 14, No. 470 (C–0769) Oct. 15, 1990 & JP–A–02 191733 (Kawashima Textile Manufacturing Ltd) Jul. 27, 1990.
PCT International Search Report for PCT/US94/04687.
Supplementary European Search Report for Application No. EP 94 91 6596.

* cited by examiner

Primary Examiner—Cheryl A. Juska
(74) Attorney, Agent, or Firm—Sutherland Asbill & Brennan LLP

(57) ABSTRACT

An improved, washable track control mat made of varied denier fibers and method of making the same. The mat is made by first making yarn made of fine and coarse denier fibers. The fibers are twisted together. More than one yarn may be twisted together. The yarn or yarns may be heat treated. The yarn or yarns are then fed into a tufting machine where tufts of varied denier fibers are held within a substrate. The tufts are bonded to the substrate by a backing, preferably rubber.

17 Claims, 1 Drawing Sheet

TRACK CONTROL MAT AND METHOD OF MAKING THE SAME

TECHNICAL FIELD

The present invention relates generally to carpet, and more particularly relates to an improved carpet with coarse and fine fibers, and a process for making the same. The carpet, when used as a mat, removes large and small dirt particles from footwear due to improved grit and particulate gripping and moisture absorbing capabilities.

BACKGROUND OF THE INVENTION

Many different carpets exist for varied purposes. Carpets are manufactured generally by feeding yarn from spools through needles into a substrate. This process is known in the art as "tufting." The type of yarn, length of needle, the needle spacing, and whether the yarn is looped or cut are just a few factors that relate to the final carpet product and its intended use. This invention relates to carpet that is manufactured for use in making mats, such as welcome mats or "track control" mats as they are known in the industry.

Typically, track control mats are placed at or near an entrance of a house or other building to remove dirt, moisture or other matter from the bottom of the shoes, and conveyances (such as grocery carts and dollies) used by persons entering the building. The wiping action should occur as the result of normal walking of one or two steps on the mat before the persons walk through the interior of the building.

To prevent dirt and moisture from being tracked from outside throughout the interior of the building, the mats must not only have the ability to remove moisture and dirt from footwear, but also to store the dirt and moisture within the body of the mat. If a mat does not effectively store the dirt and moisture within the mat, and leaves the dirt and moisture on the surface of the mat, the dirt and moisture will re-attach or stick to the bottom of footwear of other persons who subsequently walk on the mat. Dirt and moisture which re-attaches or sticks in this manner will then be tracked throughout the building, a condition known in the art as "re-tracking".

Some types of track control mats are made of a combination of coarse and fine fibers or filaments (hereinafter collectively referred to as "fibers"). These mats have been widely used in the past for the purpose of removing soil, moisture and other matter from a person's shoes or outer footwear. The coarse fibers help to remove large particles of dirt and the fine fibers help to remove the fine particulate and moisture. There should be sufficient space between fibers to temporarily hold dirt and moisture to prevent re-tracking.

The intended use of a mat relates to the manner in which the mat is constructed. For example, if a mat will be exposed to significant moisture, the mat may be designed to contain a greater number of fine fibers to absorb and hold the moisture within its recesses. On the other hand, a mat that may be exposed to a significant amount of large particles of dirt may need to have a greater number of coarse fibers.

The degree of coarseness or fineness of a fiber is measured by its denier. The term "denier" refers to the weight in grams for a 9,000 meter fiber. A coarse fiber or filament for use in track control mats typically ranges in denier from 100 to 2,000 denier per filament ("dpf"); and fine fibers for the same application typically range from 15 to 100 dpf.

Commercial and public buildings receive large volumes of pedestrian traffic. As a result, the mats in these buildings should be able to remove and store large quantities of dirt and moisture on a daily basis. For continuously effective dirt removal, most mats should be cleaned periodically so that the dirt and moisture stored within the mat are removed. The most effective way to clean mats is to wash them. Some mats cannot be washed due to the types of materials used and method employed in manufacturing the mat. Mats that cannot be washed and reused have a limited effectiveness or lifetime.

Most track control mats are made with a backing that holds the tufts in place relative to the substrate. The backing is typically a plastic or rubber material that is melted or vulcanized and applied to the substrate. In this state, the backing bonds the tufts to the substrate.

Because of the desirability for periodic washings, mats should be manufactured in a manner that will withstand continued exposure to washing and drying. The materials used to make the mat should be able to withstand elevated temperatures in both the washing and drying processes. In addition, mats should be constructed so that the tufts do not separate from the backing during the cleaning process. Adhesion of the tufts to the carpet backing is known as "tuft lock." Many commercially available track control mats at present exhibit poor tuft lock and, as a result, are ineffective for reuse after washing.

Other types of track control mats already exist. In U.S. Pat. No. 4,045,605 ("the '605 patent") issued to Breens et al., coarse and fine fibers are used to create one type of track control mat. Breens et al. describes consecutively feeding coarse and fine fibers into the tufting machine from two separate sources. In addition, according to Breens et al., the coarse and fine fibers can be alternately fed to the tufting machine to create alternating areas of course and fine fibers on the mat. While this type of track control mat appears to be effective in removing undesirable dirt and other particles from footwear, it is susceptible to wear out in a short period of time. The concentrated areas of stiff fibers exhibits poor tuft lock and become dislodged from the track control mat during use as well as during washing and drying. Moreover, the concentrated areas of stiff fibers, described in Breens et al., tend to lie down against the backing. Conversely, if the mat were manufactured to provide sufficient stability for the coarse fibers, the fine fibers would have to be so densely tufted to support the coarse fibers inserted therein that the mat would be completely ineffective in retaining dirt or moisture.

U.S. Pat. No. 4,820,566 ("the '566 patent") and U.S. Pat. No. 5,055,333 ("the '333 patent"), both issued to Heine et al., also describe the use of a mixture of fine and coarse fibers tufted to form a track control mat. The '566 and '333 patents teach that the coarse fibers should be separated from the fine fibers, typically to form a striped or checkerboard arrangement between the two types of fibers. While this type of track control mat may be effective at removing and storing dirt and other particles from the bottoms of shoes, the coarse fibers tend to become dislodged during use or washing of the mat because they are not adequately secured to the mat backing. The tuft lock for these fibers is poor because when the coarse fibers are bonded to the backing at separate locations from the fine fibers, the coarse fibers do not bond well by themselves to the backing. Thus, when the mat is used and washed, many of the coarse fibers become dislodged from the backing. This renders the mat less effective in dirt and moisture removal and storage after a short period of time.

The '566 patent also describes a mat made with at least some crimped coarse fibers. Mats manufactured in accordance with the '566 patent are extremely difficult to manufacture because the crimped fibers kink up as they are fed through the tufting needles which causes the fibers to eventually break. This requires the entire process to be shut down, the needles rethreaded and the process restarted. The continuous kinking and ultimate breakage of the crimped coarse fibers results in a poor quality mat having many broken coarse fibers and many unattractive knots where the crimped fibers had to be reknotted or spliced to continue the tufting process. The frequent breakage of the crimped coarse fibers results in a significant decrease in productivity. In addition, mats using crimped fibers are also more expensive to manufacture due to the added process cost of crimping the fiber.

The '333 patent describes a mat made with at least one looped, uncrimped, coarse fiber. While mats made in accordance with the '333 patent do not have some of the above-identified problems associated with crimped fibers, it has been found that looped pile mats are less effective in dirt removal. The term "pile" refers to the surface appearance of the carpet or mat. Carpet pile is either cut or looped. Mats having looped pile are difficult to clean and remove the dirt held therein. Thus, after a period of time, the mats having looped pile become less effective at dirt removal and storage.

Accordingly, there is a need for a washable track control mat made of varied denier fibers that is effective in removing and storing large and small dirt particles, moisture and other matter.

There is a further need for a washable track control mat that exhibits good tuft-lock so that the tufted fibers do not separate from the backing.

There is still a further need for a washable track control mat made of varied denier fibers wherein the coarse, high denier fibers will not separate from the backing after use or when subjected to commercial washing and drying.

There is yet a further need for an effective washable track control mat made with reduced yarn processing costs.

There is yet a further need for a method of manufacturing a washable track control mat made of varied denier fibers wherein the mat is effective in removing and storing large and small dirt particles, moisture and other matter.

There is a further need for a method of manufacturing a washable track control mat that exhibits good tuft-lock so that the tufted fibers do not separate from the backing.

There is still a further need for a method of manufacturing a washable track control mat made of varied denier fibers wherein the coarse, high denier fibers will not separate from the backing after use or when subjected to commercial washing and drying.

There is yet an even further need for a method of manufacturing a washable track control mat where yarn processing costs are reduced.

SUMMARY OF THE INVENTION

As will be seen, the present invention overcomes these and other disadvantages associated with prior art track control mats. Stated generally, the present invention provides a washable track control mat comprising tufts with at least one tuft being made of a yarn that is made of at least one fine denier fiber and at least one coarse denier fiber. The yarn is made by twisting together the coarse denier fiber with the fine denier fiber. The mat includes a substrate for receiving the tufts. The tufts in the substrate are bonded to a backing.

The present invention also is directed to a method for manufacturing a washable track control mat. The method includes twisting together at least one coarse denier fiber with at least one fine denier fiber to create a yarn. The method also includes tuffing the yarn through a substrate and bonding the tufts to the substrate.

Thus, it is an object of the present to provide a washable track control mat made of varied denier fibers that is effective in removing and storing large and small dirt particles, moisture and other matter.

It is a further object of the present invention to provide a washable track control mat that exhibits good tuft-lock so that the tufted fibers do not separate from the backing.

It is a further object of the present invention to provide a washable track control mat made of varied denier fibers wherein the coarse, high denier fibers will not separate from the backing after use or when subjected to commercial washing and drying.

It is a further object of the present invention to provide an effective, washable track control mat with reduced yarn processing costs.

It is yet a further object of the present invention to provide a method of manufacturing a washable track control mat made of varied denier fibers wherein the mat is effective in removing and storing large and small dirt particles, moisture and other matter.

It is yet an even further object of the present invention to provide for a method of manufacturing a washable track control mat that exhibits good tuft-lock so that the tufted fibers do not separate from the backing.

It is still a further object of the present invention to provide a method of manufacturing a washable track control mat made of varied denier fibers wherein the coarse, high denier fibers will not separate from the backing after use or when subjected to commercial washing and drying.

It is yet a further object of the present invention to provide a method of manufacturing a washable track control mat where yarn processing costs are reduced.

Other objects, features and advantages of the present invention will be apparent upon reading the following specification taken in conjunction with the drawings and appended claims.

DETAILED DESCRIPTION OF THE PREFERRED EMBODIMENTS

Figure 1:
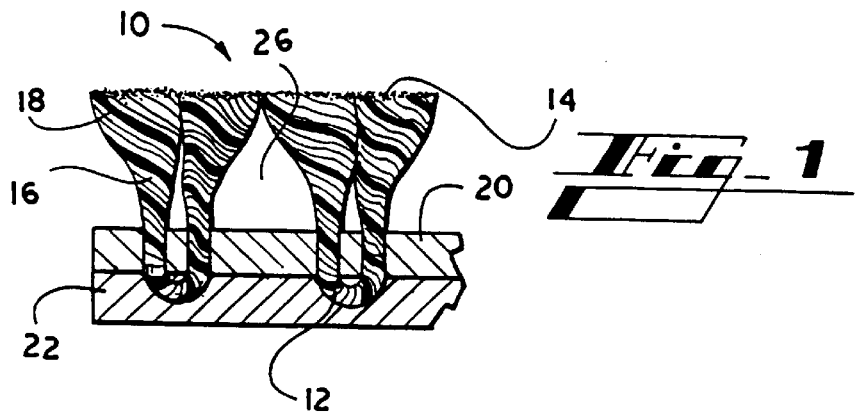
FIG. 1 is a cross-sectional view of a portion of a washable track control mat of the present invention made with single yarn tufts.

Referring now to the drawings in which like numerals indicate like elements throughout the several views, FIG. 1 shows a side view of a portion of a track control mat 10. The mat 10 is made of a plurality of tufts 12. The tufts 12 each include a yarn 14 made of a plurality of fine fibers 16 and one coarse fiber 18. The coarse fiber 18 is preferably made of nylon or polyester. The tufts 12 are secured to a substrate 20 by means of a backing 22. The backing 22 bonds the tufted yarns 14 to the substrate 20. The backing 22 is preferably vulcanized rubber.

The mat 10 is made by first manufacturing the yarn 14 used in the tufting process. The yarn 14, as shown in FIG.

2, is made of a plurality of fine fibers 16 twisted with one or more coarse fibers 18. The denier range for the fine fibers 16 is preferably between 20 and 24, and the denier range for the coarse fibers 18 is 300–600. It is preferable that one coarse fiber 18 is used with a plurality of fine fibers 16 in each yarn 14. The preferred weight ratio of fine fibers 16 to coarse fibers 18 is 20–24% to 76–80%, respectively.

The fine fibers 16 are twisted with the coarse fiber 18 to form a single-ply yarn 14. The twist of the fine fibers 16 enables the fine fibers to stand up better when they are tufted into the substrate 20. Moreover, the twist of the fine fibers 16 help to support the coarse fiber 18 within the body of the yarn 14 so that the coarse fiber does not lie down when the mat 10 is finished. It is preferred that the yarn 14 be twisted 5 to 6 turns per inch.

Once the yarn 14 is twisted, it may be heat treated to set the twist in the fine fibers 16. Some of the preferred fine fibers 16 used in the yarn 14 are made of non-heatset materials and do not need to be heat treated. Thus, the heat treatment of the yarn 14 after twisting is optional.

Figure 2:
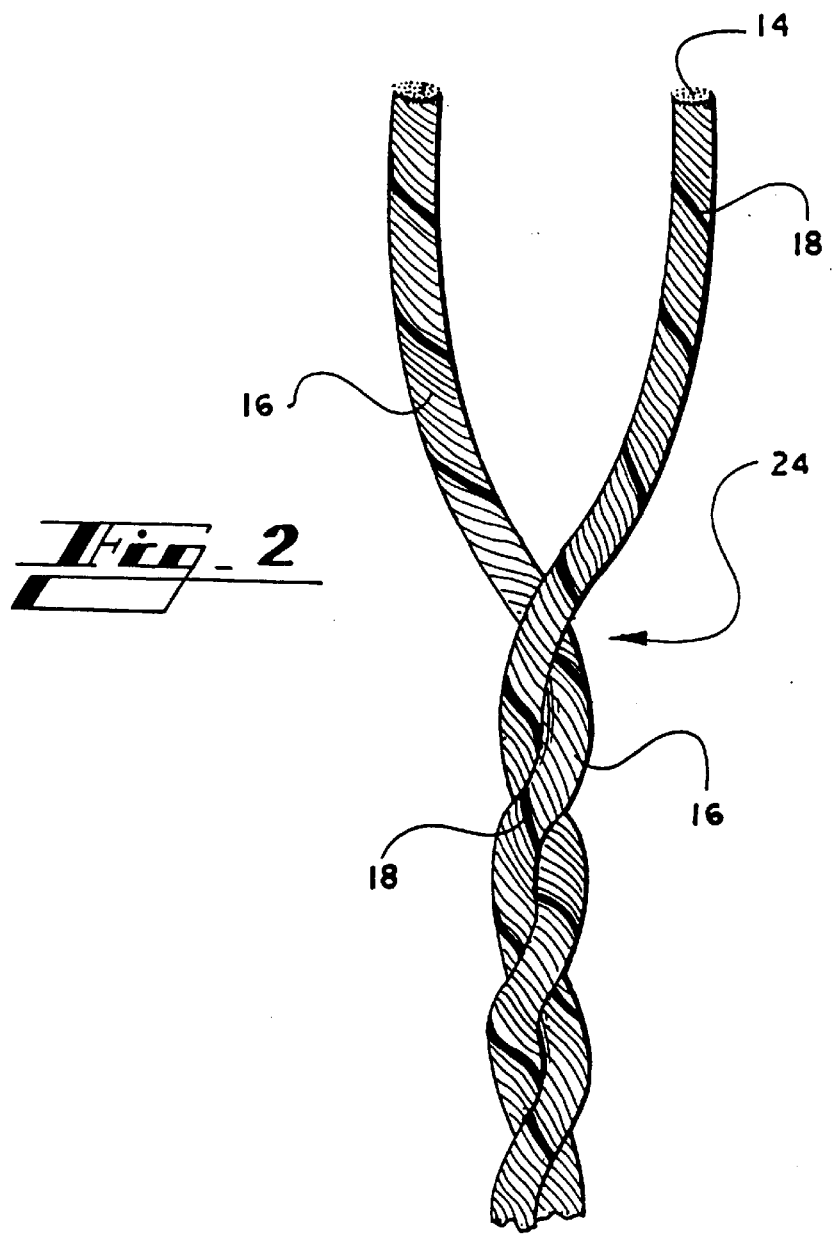
FIG. 2 is a perspective view of a double-ply yarn that may be used in the manufacture of the present invention.

It has been found that a plurality of yarns 14 or "plies" may be used in the manufacture of the mat 10 of the present invention. FIG. 2 shows two single-ply yarns 14 being twisted together to form a double or two-ply yarn 24. The number of plies affects the resultant mat product 10, along with other factors discussed in detail below.

After the yarn 14 is twisted and heat treated, if desired, and twisted with another yarn, if desired, the yarn is wound on spools and fed into tufting needles of a tufting machine where the tufts 12 of the mat 10 are formed into the substrate 20, shown in FIG. 1. After the tufts 12 are formed, the tufting machine cuts the tufts at the desired length. In the present invention, the tuft length or pile height preferably ranges from ¼ to ¾ inches. Moreover, the needles in the tufting machine may be arranged to alter the density of the mat 10. The distance between needles or "gauge" should preferably range from 5/32 to 3/16 inches. In addition, the number of stitches each needle makes per inch impacts the final product of the mat 10. Generally, the needles tuft between 3 and 10 stitches per inch. It is preferred that the needles make between 5 to 7 stitches per inch for a 5/32 inch gauge and between 5 to 8 stitches per inch for a 3/16 gauge. The particular dimensions specified herein provides a mat 10 with sufficient numbers of voids 26 between the tufts 12 to receive and store dirt and moisture in sufficient volumes required of an effective track control mat.

The resultant mat 10 will vary in weight for a fixed length of carpet as a result of the different variables discussed above. It is preferred that the resultant mat 10 weigh between 16 to 24 ounces per square yard prior to the application of any backing 22.

Once the yarn 14 has been fed through the tufting needles and into the substrate 20, the mat 10 is moved from the tufting machines to an area where the backing 22 is applied to the to bond the tufts 12 to the substrate 20. The backing 22 holds the individual tufts 12 to the substrate 20 and is machine washable. This feature enables the mat 10 to be subjected to commercial washing without degradation of the tufts 12. A backing 22 made of rubber is also skid resistant and prevents the mat 10 from moving around once it is placed on the floor.

Applicant has conducted two tests to determine the effectiveness of the tuft-lock of mats made in accordance with the teachings of the present invention. The first test involved washing a first mat made in accordance with the present invention and a second mat made pursuant to the disclosure in the '566 and '333 patents. Both mats were washed twenty (20) times. A visual comparison was made of the two mats. The mat made in accordance with the teachings of the present invention showed no significant loss of coarse or fine fiber. However, the mat made in accordance with the '566 and '333 patents showed significant loss of coarse fiber. This test demonstrates the capability of the present invention to achieve effective tuft-lock and maintain such tuft-lock after many washings.

The second test was related to analytically determining the effectiveness of the tuft-lock of the present invention. Applicant compared the fiber loss of mat samples made in accordance with the present invention (set 1) with those made in accordance with the '566 and '333 patents (set 2). Both sets of samples were bone dried and weighed, then soaked with water, hung and allowed to drip dry for five (5) minutes. Both sets were then abraded for 2,500 cycles on a U.S. Testing Abrasion Tester. After being abraded, both sets were bone dried and weighed again. Set 1 showed a loss of 0.555 grams. Set 2 showed a loss of 2.094 grams. The significant fiber loss of the mats made in accordance with the '566 and '333 patents further demonstrates the effectiveness of the tuft lock achieved with the mats made pursuant to the present invention.

It will be appreciated that the embodiments discussed above are the preferred embodiments, and that various alternative embodiments are contemplated, falling within the scope of the appended claims. For example, while nylon or polyester may be the preferred materials for use as the coarse fiber, natural fibers, such as jute may be used.

It should be understood that the foregoing relates only to preferred embodiments of the present invention and that numerous modifications or alterations may be made therein without departing from the spirit and scope of the invention as set forth in the appended claims.

We claim:

1. A process for making a machine washable track control mat, comprising the steps of:

twisting together at least one coarse denier fiber with at least one fine denier fiber to create a yarn;

tufting the yarn through a substrate to form a plurality of tufts in the backing; and bonding the tufts to the substrate with vulcanized rubber such that the mat is machine washable without substantial degradation of tufts, the steps of tufting and bonding carried out so that the tufts are structured and arranged in the backing such that the tufts remove and store dirt and moisture in voids between the tufts to control tracking of dirt and moisture.

2. The process of claim 1 wherein there are a plurality of fine denier fibers.

3. The process of claim 1 wherein the yarn is tufted through the substrate at a rate of 3 to 10 stitches per inch.

4. The process of claim 1 wherein the yarn is twisted 5 to 6 turns per inch.

5. The process of claim 1 further comprising the step of heat treating the yarn after the yarn is twisted.

6. The process of claim 1 wherein the coarse denier fiber is an uncrimped fiber capable of scraping action.

7. A machine washable track control mat, comprising:

a plurality of tufts;

a substrate to receive the tufts; and a backing of vulcanized rubber which bonds the tufts to the substrate such that the mat is machine washable without substantial degradation of tufts;

wherein each of the plurality of tufts comprises a yarn made of at least one fine denier fiber twisted together with at least one coarse denier fiber and the tufts are structured and arranged in the backing such that the tufts remove and store dirt and moisture in voids between the tufts to control tracking of dirt and moisture.

8. The machine washable track control mat of claim 7 wherein the yarn is heated treated.

9. The machine washable track control mat of claim 7 wherein the yarn is received into the substrate at a rate of 3 to 10 stitches per inch.

10. The machine washable track control mat of claim 7 wherein the yarn is twisted 5 to 6 turns per inch.

11. The machine washable track control mat of claim 7 wherein the mat weighs between 16 and 24 ounces per square yard without the vulcanized rubber.

12. The machine washable track control mat of claim 7 wherein the weight ratio range of fine denier fibers to coarse denier fibers is between 20–24% to 76–80% respectively.

13. The machine washable track control mat of claim 7 wherein the coarse denier fiber is an uncrimped fiber capable of scraping action.

14. A process for making a machine washable track control mat, comprising the steps of:
   twisting together at least one coarse denier fiber with at least one fine denier fiber to create a single-ply yarn;
   twisting together one length of single-ply yarn with another length of the single-ply yarn to create a two-ply yarn;
   tufting the two-ply yarn through a substrate to form a plurality of tufts in the backing; and
   bonding the tufts to the substrate with vulcanized rubber such that the mat is machine washable without substantial degradation of tufts;
   wherein the coarse denier fiber is an uncrimped fiber capable of scraping action and the steps of tufting and bonding are carried out so that the tufts are structured and arranged in the backing such that the tufts remove and store dirt and moisture in voids between the tufts to control tracking of dirt and moisture.

15. A machine washable track control mat, comprising:
   a plurality of tufts;
   a substrate to receive the tufts; and
   a backing of vulcanized rubber which bonds the tufts to the substrate such that the mat is machine washable without substantial degradation of tufts;
   wherein each of the plurality of tufts comprises a two-ply yarn made by twisting together two single-ply yarns each comprised of at least one fine denier fiber twisted together with at least one coarse denier fiber and the tufts are structured and arranged in the backing such that the tufts remove and store dirt and moisture in voids between the tufts to control tracking of dirt and moisture and wherein the coarser denier fiber is an uncrimped fiber capable of scraping action.

16. A process for making a machine washable track control mat, comprising the steps of:
   twisting together at least one coarse denier fiber having a denier from 300 to 600 with at least one fine denier fiber having a denier from 15 to 100 to create a yarn;
   tufting the yarn through a substrate to form a plurality of tufts in the backing at a rate of 3 to 10 stitches per inch, a gauge of $5/32$ to $3/16$ inches, and a pile height of $1/4$ to $3/4$ inches; and
   bonding the tufts to the substrate with vulcanized rubber such that the mat is machine washable without substantial degradation of tufts,
   the steps of tufting and bonding carried out so that the mat weighs between 16 and 24 ounces per yard without the vulcanized rubber backing, the weight ratio range of fine denier fibers to coarse denier fibers is between 20–24% to 76–80% respectively, and the tufts are structured and arranged in the backing such that the tufts remove and store dirt and moisture in voids between the tufts to control tracking of dirt and moisture.

17. A machine washable track control mat, comprising:
   a substrate;
   a plurality of tufts tufted into the backing at a rate of 3 to 10 stitches per inch, a gauge of $5/32$ to $3/16$ inches, and a pile height of $1/4$ to $3/4$ inches; and
   a backing of vulcanized rubber which bonds the tufts to the substrate such that the mat is machine washable without substantial degradation of tufts;
   wherein each of the plurality of tufts comprises a yarn made of at least one fine denier fiber having a denier from 15 to 100 twisted together with at least one coarse denier fiber having a denier from 300 to 600, the mat weighs between 16 and 24 ounces per yard without the vulcanized rubber backing, the weight ratio range of fine denier fibers to coarse denier fibers is between 20–24% to 76–80% respectively, and the tufts are structured and arranged in the backing such that the tufts remove and store dirt and moisture in voids between the tufts to control tracking of dirt and moisture.

* * * * *